US00RE49779E

(19) United States
(12) Reissued Patent
Girolami et al.

(10) Patent Number: US RE49,779 E
(45) Date of Reissued Patent: Jan. 2, 2024

(54) FLEXIBLE LIGHTING APPARATUS

(71) Applicant: Sourcemaker, Inc., Valley Cottage, NY (US)

(72) Inventors: Peter R. Girolami, Palisades, NY (US); Joseph M. DeJoia, Blauvelt, NY (US)

(73) Assignee: Sourcemaker, Inc., Valley Cottage, NY (US)

(21) Appl. No.: 16/414,227

(22) Filed: May 16, 2019

Related U.S. Patent Documents

Reissue of:
(64) Patent No.: 9,651,230
Issued: May 16, 2017
Appl. No.: 14/616,243
Filed: Feb. 6, 2015

U.S. Applications:
(60) Provisional application No. 61/937,406, filed on Feb. 7, 2014.

(51) Int. Cl.

| | |
|---|---|
| ***F21V 21/14*** | (2006.01) |
| ***F21V 23/06*** | (2006.01) |
| ***G03B 15/02*** | (2021.01) |
| ***F21V 19/00*** | (2006.01) |
| ***F21V 21/005*** | (2006.01) |
| ***F21L 14/02*** | (2006.01) |
| ***F21V 17/00*** | (2006.01) |
| ***F21S 4/10*** | (2016.01) |
| ***F21Y 113/00*** | (2016.01) |
| ***F21Y 115/10*** | (2016.01) |

(52) U.S. Cl.
CPC ..... *F21V 21/145* (2013.01); *F21L 14/023* (2013.01); *F21V 17/007* (2013.01); *F21V 19/0025* (2013.01); *F21V 21/005* (2013.01); *F21V 23/06* (2013.01); *G03B 15/02* (2013.01); *F21S 4/10* (2016.01); *F21Y 2113/00* (2013.01); *F21Y 2115/10* (2016.08)

(58) Field of Classification Search
CPC .... F21V 19/0025; F21V 23/06; F21V 17/007; F21V 21/005; F21V 21/145; F21L 14/023; G03B 15/02; F21Y 2113/00; F21Y 2115/10; F21S 4/10
See application file for complete search history.

(56) References Cited

U.S. PATENT DOCUMENTS

| | | | |
|---|---|---|---|
| 3,894,225 | A | 7/1975 | Chao |
| 4,173,035 | A | 10/1979 | Hoyt |
| 4,439,818 | A | 3/1984 | Scheib |
| 4,607,317 | A | 8/1986 | Lin |
| 4,782,336 | A | 11/1988 | Bailey |
| 4,970,812 | A | 11/1990 | Tanaka et al. |
| 5,057,981 | A | 10/1991 | Bowen et al. |

(Continued)

FOREIGN PATENT DOCUMENTS

| | | | |
|---|---|---|---|
| WO | 2002061328 | 8/2002 | |
| WO | WO-2008127050 A1 * | 10/2008 | ..... G02F 1/133603 |
| WO | 2014145416 | 9/2014 | |

*Primary Examiner* — William C Doerrler
(74) *Attorney, Agent, or Firm* — Lowenstein Sandler LLP

(57) ABSTRACT

A lighting apparatus comprising a light emitting diode (LED) arrangement encased in a blanket-like body is provided. The blanket-like body is constructed in a manner allowing for the lighting apparatus to be rolled up for ease of storage and transport.

11 Claims, 7 Drawing Sheets

(56) References Cited

U.S. PATENT DOCUMENTS 5,162,696 A 11/1992 Goodrich
5,469,020 A 11/1995 Herrick
5,532,711 A * 7/1996 Harris ..... G02B 6/0008 340/815.42
5,697,175 A 12/1997 Schwartz
5,834,901 A * 11/1998 Shen ..... F21V 23/06 315/185 S
5,964,518 A 10/1999 Shen
6,158,882 A 12/2000 Bischoff, Jr.
6,193,385 B1 2/2001 Maki et al.
6,311,350 B1 11/2001 Kaiserman et al.
6,331,915 B1 12/2001 Myers
6,352,355 B1 3/2002 Law
6,371,637 B1 * 4/2002 Atchinson ..... F21V 19/005 362/249.04
6,394,623 B1 5/2002 Tsui
6,513,955 B1 2/2003 Waltz
6,677,918 B2 1/2004 Yuhara et al.
6,787,990 B2 9/2004 Cok
6,808,295 B2 10/2004 Waltz et al.
6,871,981 B2 3/2005 Alexanderson et al.
D509,954 S 9/2005 Waltz
7,075,226 B2 7/2006 Cok
7,246,925 B2 7/2007 Waltz et al.
7,319,408 B2 1/2008 Temple
7,354,180 B2 4/2008 Sawhney et al.
7,374,315 B2 5/2008 Dorsey et al.
7,604,377 B2 10/2009 Yu et al.
D613,886 S 4/2010 Lodhie
D614,318 S 4/2010 Lodhie
8,172,426 B2 5/2012 Frey
D675,347 S 1/2013 Wollard
8,384,295 B2 2/2013 Simi
8,410,726 B2 4/2013 Dau et al.
8,599,104 B2 12/2013 Gardner
8,690,385 B2 * 4/2014 Ubaghs ..... G09F 21/02 362/235
8,851,356 B1 10/2014 Holec et al.
2002/0187697 A1 12/2002 Kiryuschev et al.
2004/0160768 A1 8/2004 Cok
2005/0237741 A1 * 10/2005 Chang ..... A47H 13/00 362/249.01
2006/0007059 A1 1/2006 Bell
2006/0007666 A1 1/2006 Cook
2006/0082987 A1 * 4/2006 Dorsey ..... F21S 48/215 362/103
2006/0215398 A1 9/2006 Farmer et al.
2007/0182666 A1 * 8/2007 Hochman ..... G09F 19/22 345/46
2007/0217200 A1 9/2007 Yang et al.
2008/0089060 A1 4/2008 Kondo et al.
2008/0298058 A1 * 12/2008 Kan ..... F21V 15/01 362/240
2009/0059610 A1 3/2009 Marshall et al.
2009/0146910 A1 6/2009 Gardner
2009/0231834 A1 9/2009 Krohn
2009/0296382 A1 * 12/2009 Maier ..... F21V 15/01 362/218
2010/0008090 A1 1/2010 Li et al.
2010/0103649 A1 4/2010 Hamada
2011/0096531 A1 * 4/2011 Frey ..... G02F 1/133305 362/97.4
2011/0163681 A1 7/2011 Dau et al.
2011/0227487 A1 9/2011 Nichol et al.
2012/0327264 A1 * 12/2012 Spielberg ..... G03B 15/03 348/224.1
2013/0313988 A1 * 11/2013 McRae ..... H05B 37/02 315/193
2014/0254152 A1 9/2014 Bohler
2014/0268777 A1 9/2014 Saydkhuzhin et al.
2014/0362575 A1 * 12/2014 Shirilla ..... F21V 21/145 362/249.08
2016/0076708 A1 * 3/2016 Shirilla ..... F21S 2/005 362/235

* cited by examiner

FLEXIBLE LIGHTING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority to U.S. Provisional Patent Application No. 61/937,406, filed Feb. 7, 2014, the entire disclosure of which is incorporated by reference herein in its entirety.

TECHNICAL FIELD

Embodiments of the invention relate generally to a lighting apparatus and, more particularly, to a light emitting diode (LED) arrangement encased in a blanket-like body.

BACKGROUND

Proper lighting is essential in the filming and photography industry. However, many of the traditional lighting solutions offered in the industry are limited by their ability to accommodate multiple applications. This is often the case, for example, when there are frequent changes in lighting requirements or placement position. Moreover, many of the traditional lighting solutions are often impractical, lacking ease of quick setup and transportability.

Accordingly, there is a need for improved lighting solutions with particular applicability in the filming and photography industry.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
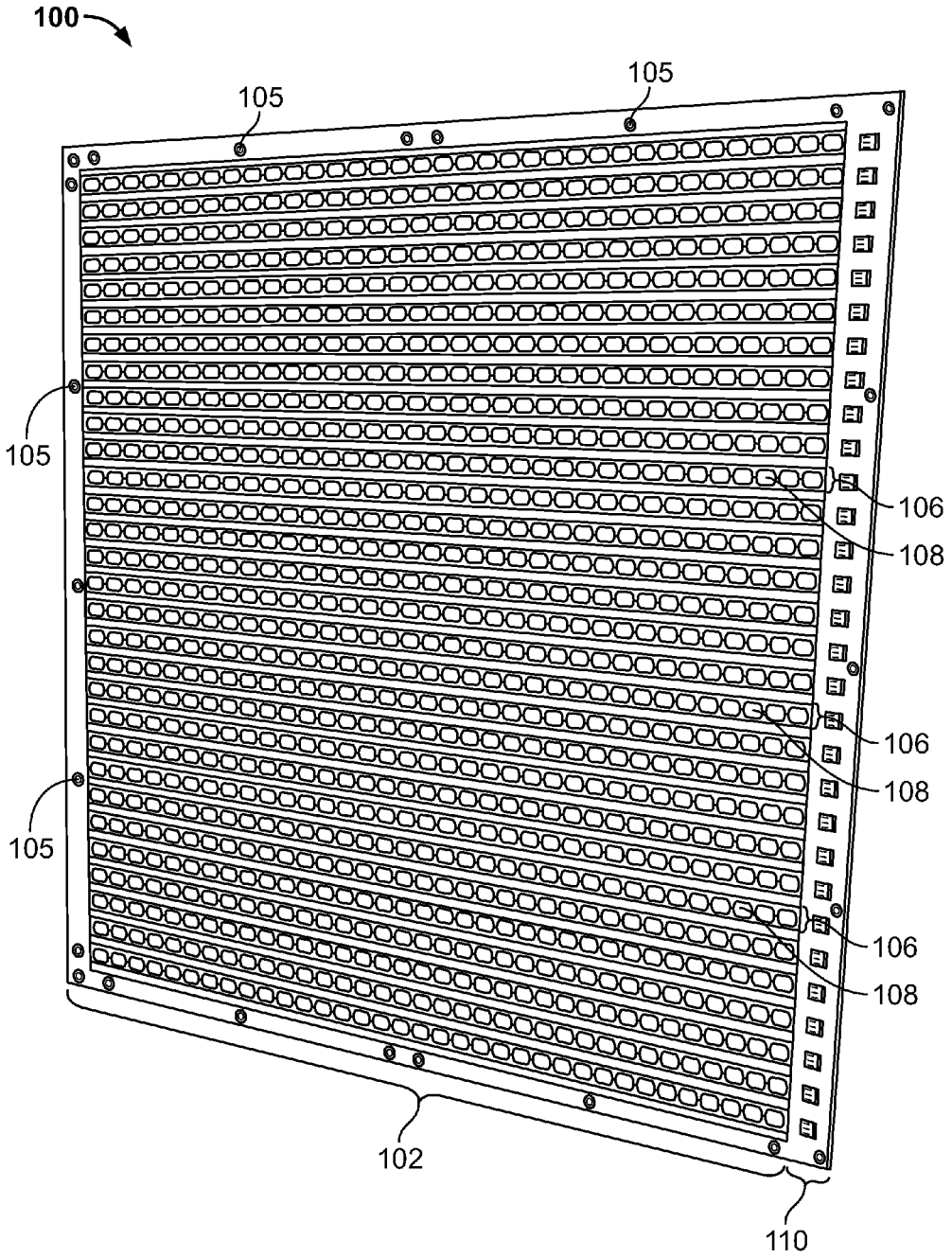
FIG. 1 illustrates a lighting apparatus in accordance with an embodiment of the present invention.
Figure 2:
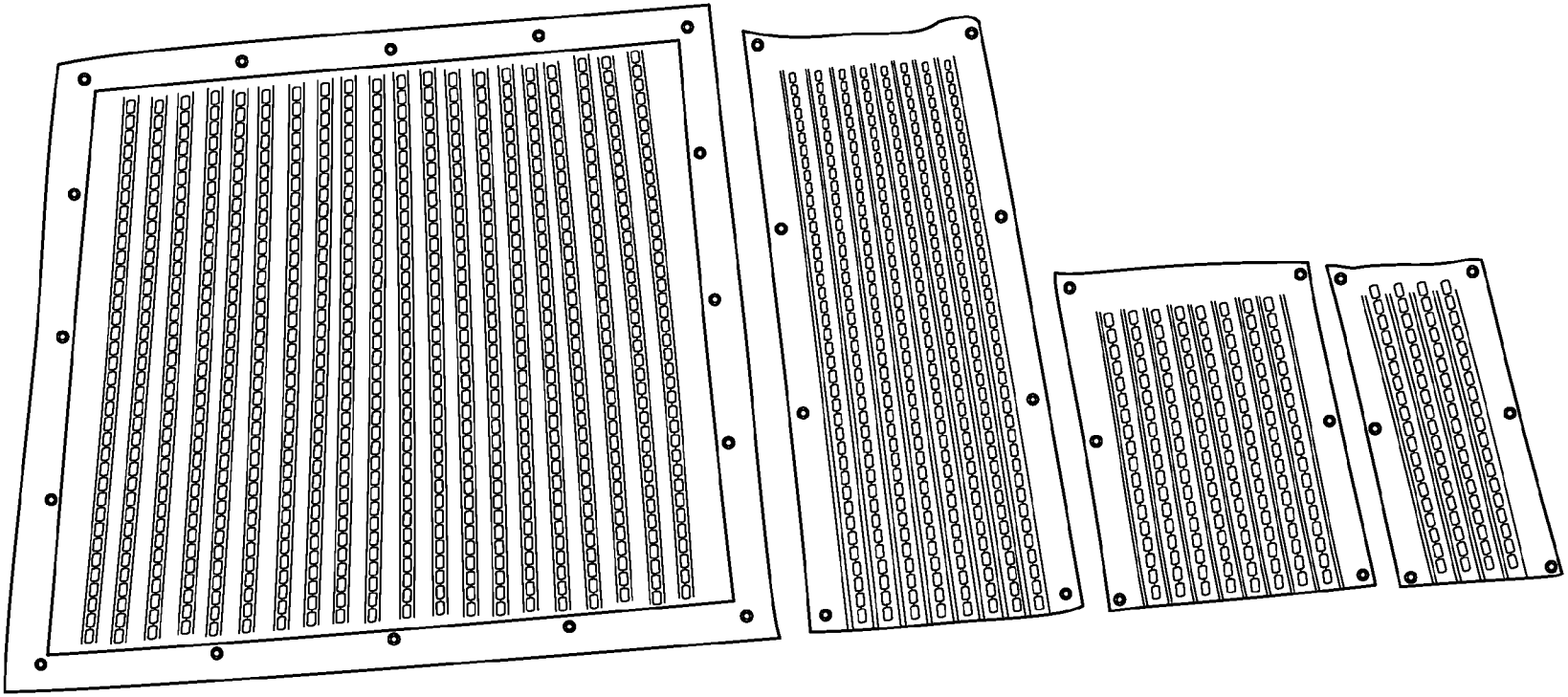
FIG. 2 illustrates varying dimensions of the lighting apparatus.

FIG. 1 illustrates an embodiment of a lighting apparatus 100 comprising a blanket-like body 102 that is adapted to be suspended from a structure (e.g., a frame). Body 102 is constructed of a flexible, yet durable, material and may be comprised of a plurality of apertures 105 along its periphery to permit a variety of suspension positions. Various dimensions of body 102 may be provided, as illustrated in FIG. 2, to service different lighting applications.

Body 102 is further comprised of a plurality of pockets 106 adapted to receive a plurality of LED arrangements 108 therein. An LED arrangement 108 may be, for example, a flexible LED ribbon or a rigid LED strip having a plurality of LED lighting elements affixed thereon. A rigid LED strip, for example, may be a color corrected lighting strip made for film, television or broadcast purposes, wherein the LED lighting elements affixed thereon may have, for example, an alternating tungsten/daylight color to allow for complete control of color temperature. It is envisioned that a plurality of lighting mixtures and color variations may be used including, but certainly not limited to, tungsten, daylight, RGB, RGBA, RGBW, hybrids or any other suitable combinations thereof.

Figure 4A:
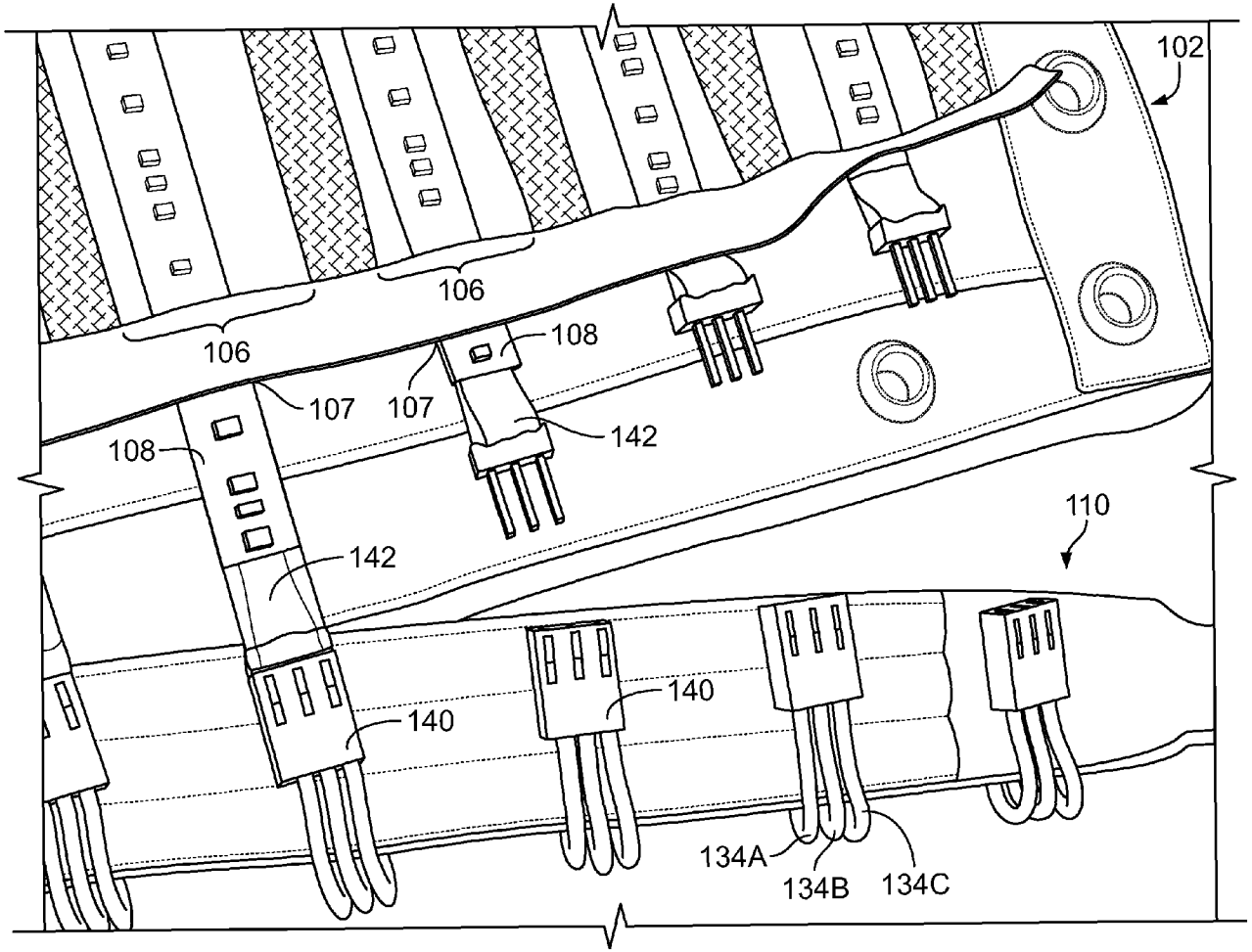
FIGS. 4A and 4B illustrate a wiring harness coupled to the blanket body and LED arrangement of the lighting apparatus.
Figure 4B:
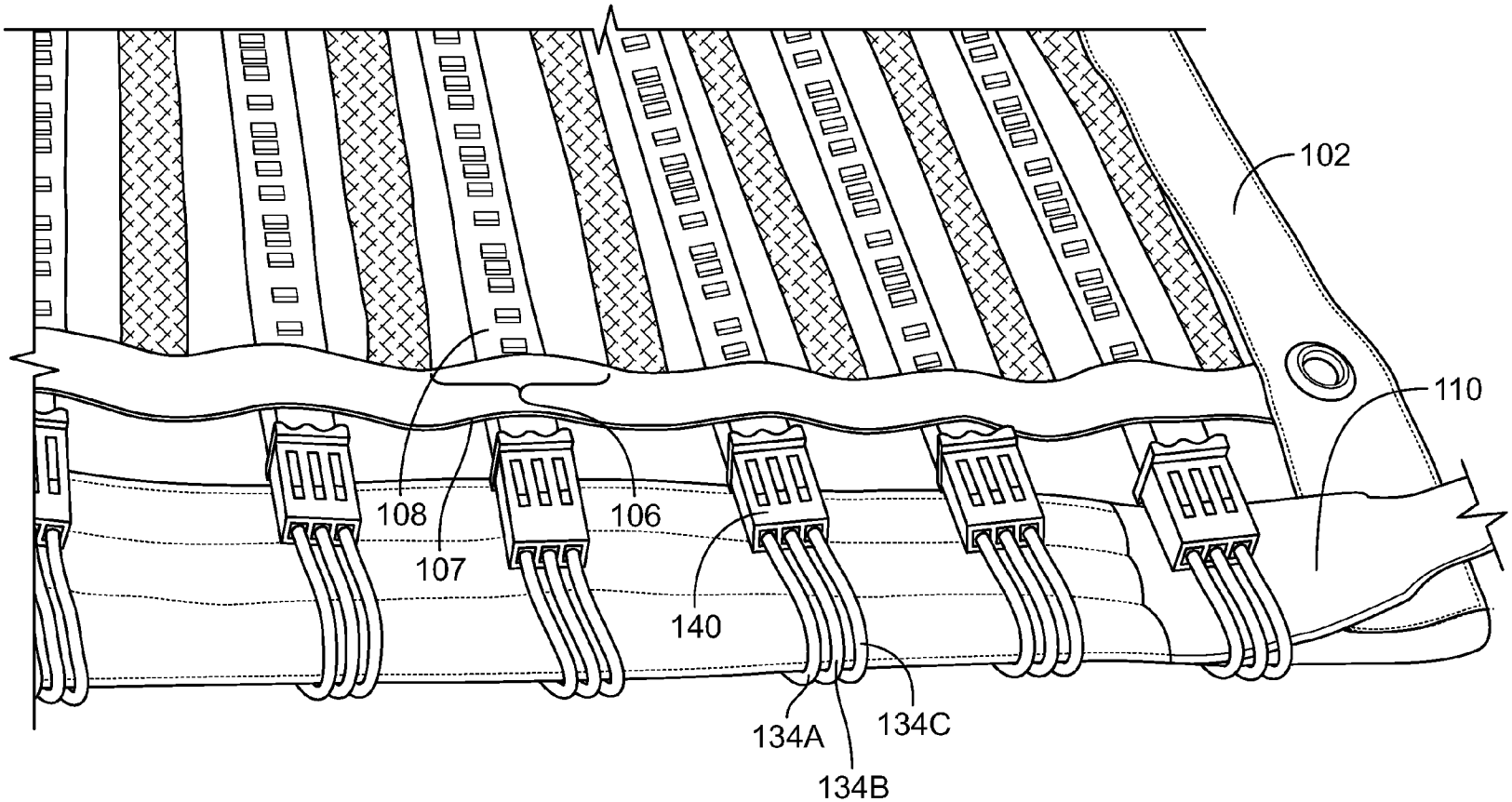

Pockets 106 may be constructed from a rigid, clear plastic formed in the shape of a tubular conduit having an opening 107 at its end, as illustrated in FIGS. 4A and 4B. An LED arrangement 108 may be slidably affixed and encased within a pocket 106 via opening 107. By allowing for LED arrangements 108 to be individually encased in each of pockets 106, any one LED arrangement 108 may be easily removed, replaced or interchanged.

Lighting apparatus 100 further comprises a wiring harness 110 that may be electrically coupled to the plurality of LED arrangements 108 provided in pockets 106 of body 102. Wiring harness 110 may form part of body 102 or be provided as a separate component part appended to body 102. Wiring harness 110 may be constructed of a durable material, similar to that used in the construction of body 102, and may also comprise a plurality of apertures along its outer periphery to aid in suspension of lighting apparatus 100. A power supply (not shown) is electrically coupled to wiring harness 110 at another end to power the plurality of LED arrangements 108.

Figure 3A:
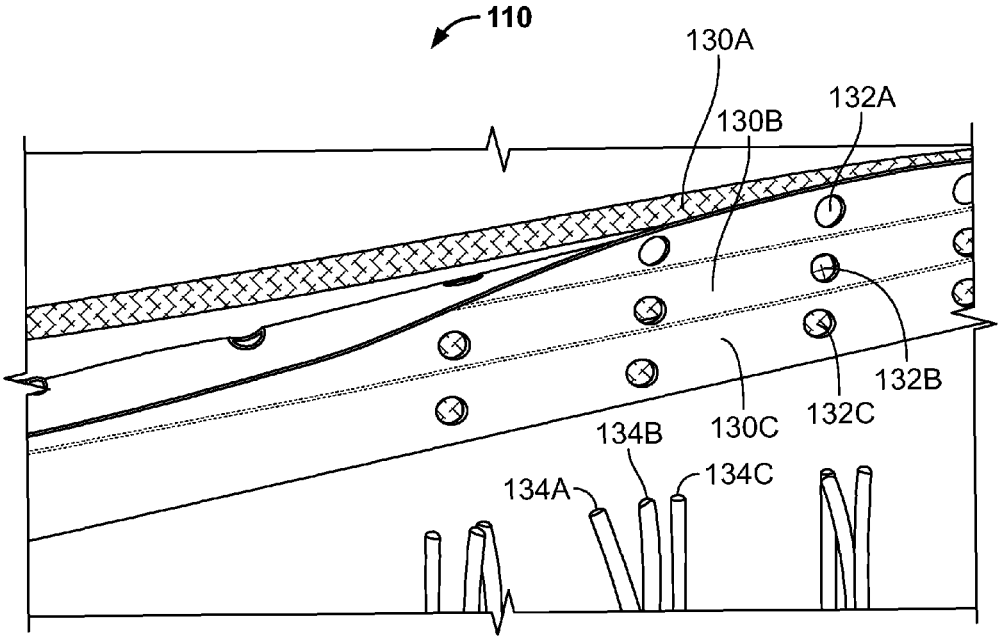
FIGS. 3A and 3B illustrate a wiring harness of the lighting apparatus.
Figure 3B:
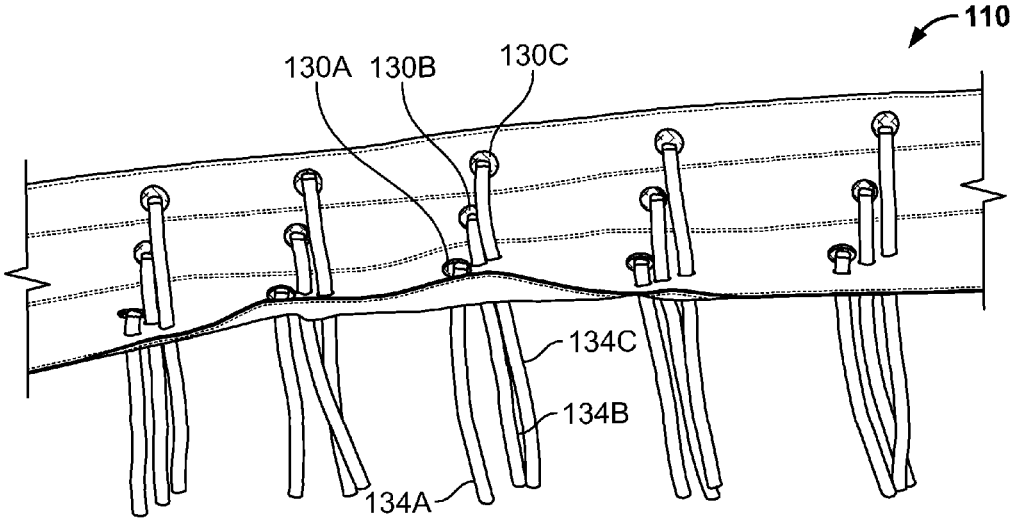

Referring to FIGS. 3A and 3B, wiring harness 110 may be comprised of three (3) braided wires 130A-C (braided wire 130A exposed). Wire openings 132A-C may be provided along the length of wiring harness 110 to allow electrical access points to each of braided wires 130A-C. Lead wires 134A-C may be coupled at one terminating end to braided wires 130A-C via wire openings 132A-C. As illustrated in FIGS. 4A and 4B, a three-prong connector 140 may be provided at the opposing terminating end of lead wires 134A-C. Each three-prong connector 140 is adapted to plug-in to three-prong leads 142 provided at the end of each LED arrangement 108 encased in pockets 106 of body 102. It should be noted that the three braided wires 130A-C and three-prong connectors 140 described herein are provided by way of example, and not by way of limitation, and more or less electrically conductive wires (e.g., in solid core, stranded or braided form) and varying multi-pin connectors may be used to accommodate a particular LED arrangement envisioned for use in body 102.

Figure 5A:
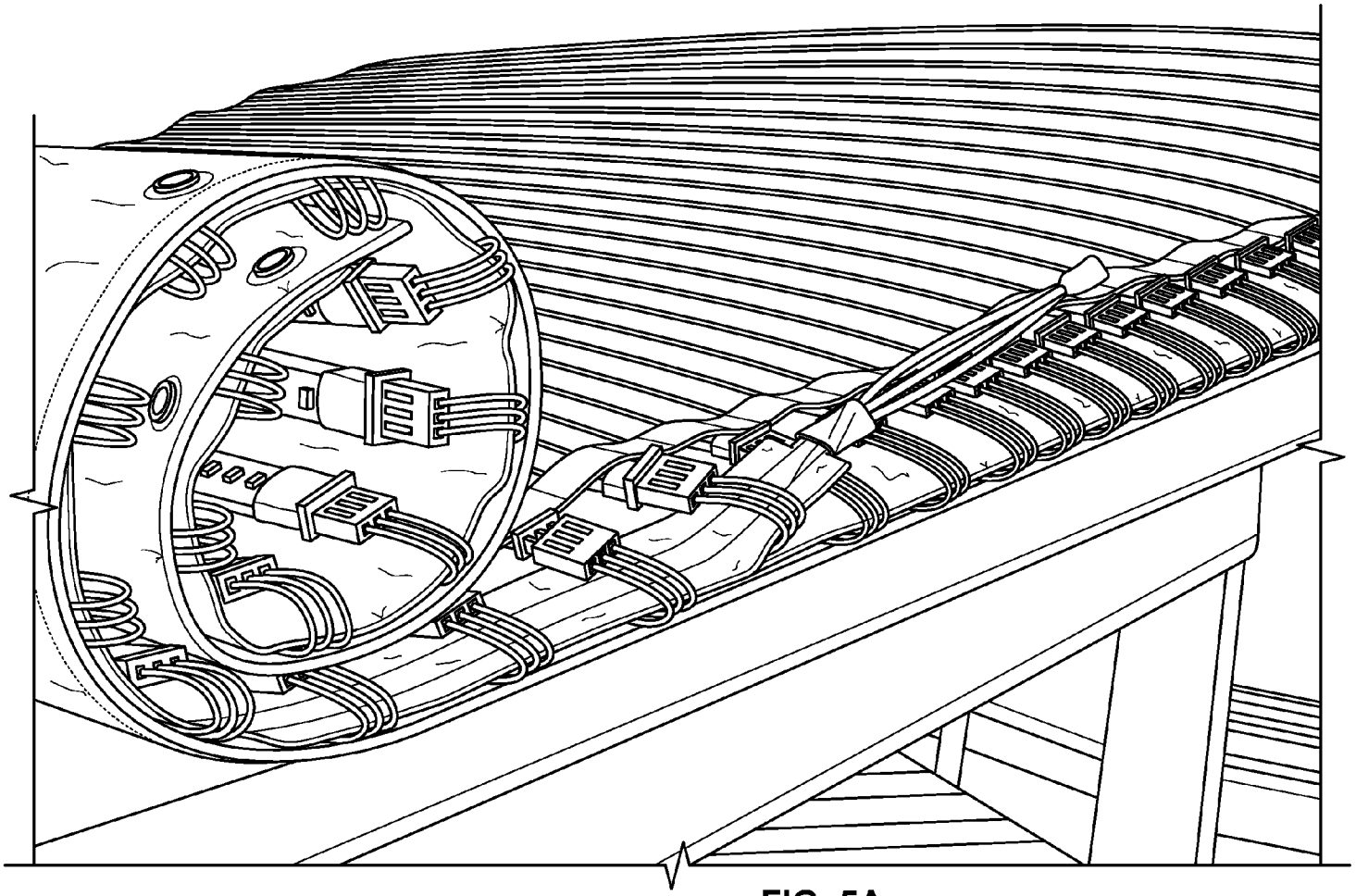
FIGS. 5A and 5B illustrate, respectively, a partially rolled up and a fully rolled up blanket body of the lighting apparatus.
Figure 5B:
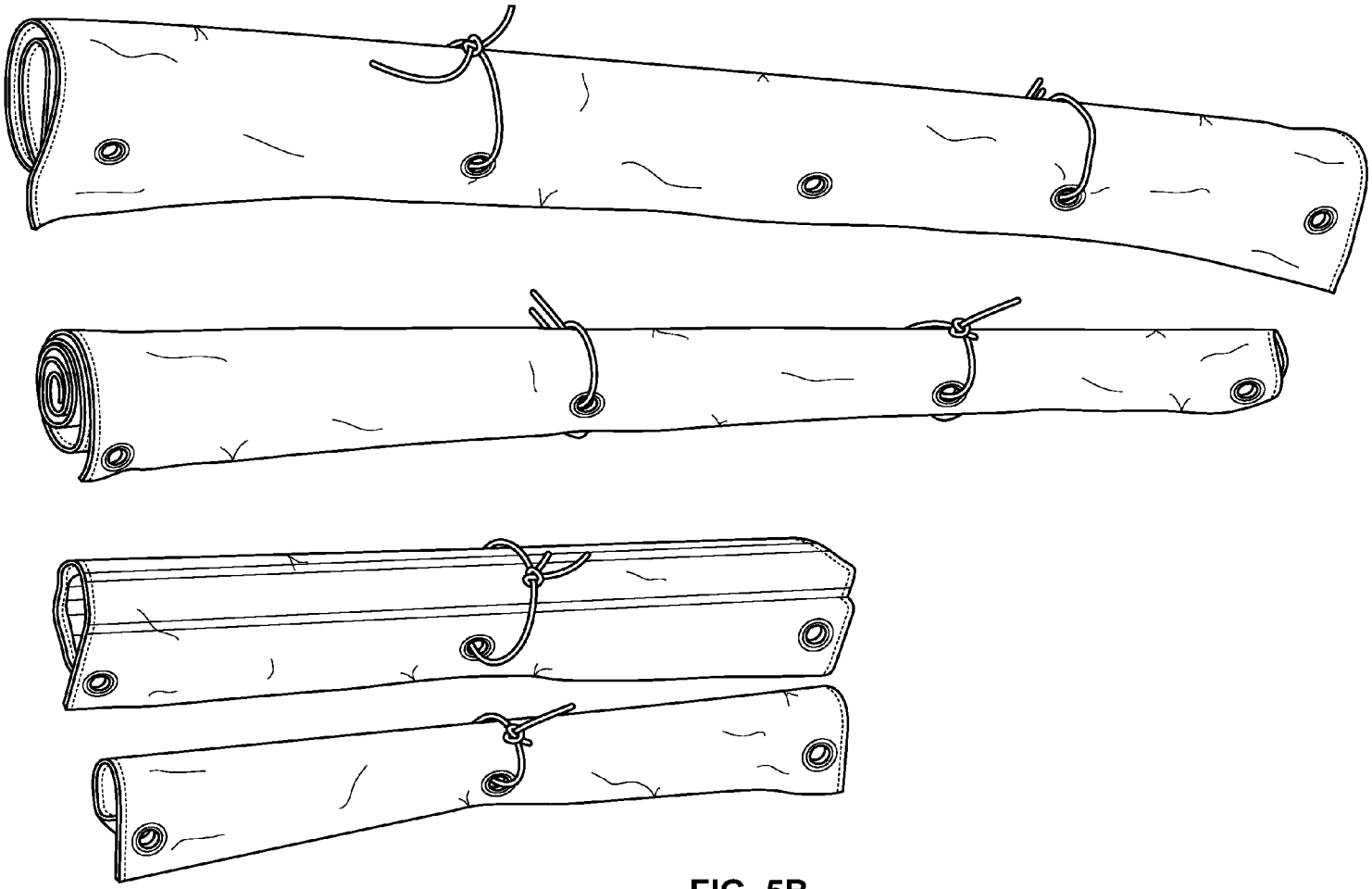

As illustrated in FIG. 4B, adequate spacing is provided between each of pockets 106, thereby permitting body 102 to be folded or rolled up for ease of storage and transport. Having the same spacing corresponding to the spacing between each of pockets 106, as well as the use of braided wires 130A-C in the manner previously described, permits wiring harness 110 to be rolled up along with body 102. A partially and fully rolled up version of body 102 is illustrated, respectively, in FIGS. 5A and 5B.

Whereas many alterations and modifications of the present invention will no doubt become apparent to a person of ordinary skill in the art after having read the foregoing description, it is to be understood that any particular embodiment described and shown by way of illustration is in no way intended to be limiting. Therefore, references to details of various embodiments do not limit the scope of the claims, which in themselves recite only those features regarded as the invention.

What is claimed is:

1. A lighting apparatus, comprising:

a blanket-like body having a plurality of pockets;

a detachable wiring harness having at least three separate wiring channels and a plurality of [three-prong] connectors *each having at least three prongs*, said wiring harness attached to said blanket-like body, each of said wiring channels embodying an electrically conductive wire coupled to a power source, each of said wiring channels constructed with a plurality of openings providing electrical access points along the length of said wiring harness, and each [three-prong] *prong of a* connector coupled to [said] *a separate* electrically conductive wire embodied in each of said [three] separate wiring channels via said plurality of openings; and a light emitting diode (LED) arrangement embodied within each of said plurality of pockets, each said LED arrangement electrically coupled to said power source independent of another said LED arrangement via said plurality of [three-prong] connectors, *wherein said LED arrangement is a color corrected lighting strip comprising a plurality of LED-driven lighting elements having at least two alternating color temperatures*.

2. The apparatus of claim 1, wherein said blanket-like body is constructed of a durable material.

3. The apparatus of claim 1, wherein said blanket-like body is flexible.

4. The apparatus of claim 1, wherein said blanket-like body is comprised of a plurality of apertures along its periphery.

5. The apparatus of claim 1, wherein each of said plurality of pockets are constructed of a clear plastic formed in the shape of a tubular opening.

6. The apparatus of claim 1, wherein said LED arrangement is a flexible LED ribbon.

7. The apparatus of claim 1, wherein said LED arrangement is a rigid LED strip.

8. The apparatus of claim 1, wherein said LED arrangement is slidably received and individually encased within each of said plurality of pockets.

9. The apparatus of claim 1, wherein said blanket-like body is constructed to permit said blanket body to be folded or rolled up.

10. The apparatus of claim 1, further comprising a suspension frame for suspending said blanket-like body.

*11. The apparatus of claim 1, wherein said at least two alternating color temperatures are a tungsten color temperature and a daylight color temperature.*

* * * * *